US009837786B2

(12) United States Patent
Almási et al.

(10) Patent No.: US 9,837,786 B2
(45) Date of Patent: Dec. 5, 2017

(54) SHORT PERIOD UNDULATOR (75) Inventors: Gábor Almási, Kozármisleny (HU); János Hebling, Pécs (HU); Csaba Töke, Pécs (HU)

(73) Assignee: University of Pécs, Pécs (HU)

( * ) Notice: Subject to any disclaimer, the term of this patent is extended or adjusted under 35 U.S.C. 154(b) by 0 days.

(21) Appl. No.: 14/239,469

(22) PCT Filed: Aug. 21, 2012

(86) PCT No.: PCT/HU2012/000076
§ 371 (c)(1),
(2), (4) Date: Jun. 20, 2014

(87) PCT Pub. No.: WO2013/024316
PCT Pub. Date: Feb. 21, 2013

(65) Prior Publication Data
US 2014/0314114 A1    Oct. 23, 2014

(30) Foreign Application Priority Data

Aug. 18, 2011    (HU) ..................................... 1100452

(51) Int. Cl.
*H01S 3/0959* (2006.01)
*H05G 2/00* (2006.01)
*H01S 3/09* (2006.01)

(52) U.S. Cl.
CPC ............. *H01S 3/0959* (2013.01); *H05G 2/00* (2013.01); *H01S 3/0903* (2013.01)

(58) Field of Classification Search
CPC ........ H01S 3/0903; H01S 3/0959; H05G 2/00
See application file for complete search history.

(56) References Cited

U.S. PATENT DOCUMENTS 5,822,342 A    10/1998  Suzuki et al.
2012/0106577 A1*  5/2012  Balcou ............................ 372/2

FOREIGN PATENT DOCUMENTS

JP    2011-118696    6/2011

OTHER PUBLICATIONS

Hirori et al. "Single-cycle terahertz pulses with amplitudes exceeding 1 MV/cm generated by optical rectification in LiNbO3", Mar. 2, 2011.*

(Continued)

*Primary Examiner* — Marcia Golub-Miller
(74) *Attorney, Agent, or Firm* — Fitch, Even, Tabin & Flannery LLP (57) ABSTRACT

The invention relates to a method for generating electromagnetic radiation (preferably UV, VUV, XUV, or X-rays), to an optical short-period undulator (10) and to a free-electron laser comprising the latter. To accomplish the method, a high-energy electrically charged particle beam (5) is provided, and high-intensity electromagnetic pulses (7, 7a, 7b) are generated, and by interfering said pulses with one another an electromagnetic standing wave is created, wherein said standing wave has an electric field strength of a pre-determined peak value. The particle beam is directed through the non-steady electromagnetic field of the standing wave in or in the vicinity of a plane spanned by nodes with maximal electric field strength of said electromagnetic standing wave. Meanwhile, by the electromagnetic field of the standing wave, the particle beam is forced to travel along an undulating path and thereby, in the form of radiation emitted by said particle beam, electromagnetic radiation that propagates in the propagation direction of the particle beam is generated. Said short-period undulator (10) comprises a pulse source (2) to emit high-intensity pulses falling into the terahertz frequency range and an interaction region to direct (Continued)

a high-energy electrically charged particle beam, in particular an electron beam, through the undulator with undulator effect. The undulator effect is provided in the interaction region through a dynamic effect developing in or in the vicinity of a plane spanned by nodes with maximal electric field strength of an electromagnetic standing wave created by the interference of high-intensity pulses falling into the terahertz frequency range, emitted by said pulse source.

19 Claims, 4 Drawing Sheets

(56) References Cited

OTHER PUBLICATIONS

Krauss, J., European Search Report; PCT/HU2012/000076 dated Jan. 28, 2013; 3 pages.

\* cited by examiner

SHORT PERIOD UNDULATOR

CROSS-REFERENCE TO RELATED APPLICATIONS

This application is the National Stage of International Application No. PCT/HU2012/000076, filed Aug. 21, 2012, which claims priority to HU P1100452 filed Aug. 18, 2011, both of which are incorporated by reference in their entireties.

The invention relates to a method for generating electromagnetic radiation, as well as to an optical short-period undulator and a free-electron laser comprising the latter.

It is known that electrons travelling (optionally with high, in particular with relativistic speeds) in varying magnetic fields can emit coherent light radiation. Operation of free-electron lasers are based just on this fact. Free-electron lasers can be used in numerous fields, they can be successfully applied, amongst others, for atmospheric physical, chemical, medical as well as radio astronomical purposes. Moreover, the free-electron lasers offer promising means for the (imaging) study of nanostructures consisting of several hundred atoms or of biological structures, for example micro-machineries or DNA molecules.

The various free-electron lasers are capable of generating intense laser radiation in any portion of the electromagnetic (EM) spectrum ranging from the infrared domain to the X-ray one. These apparatuses comprise two major parts: an electron accelerator and an undulator (or "wiggler"). The electron accelerator produces electron packets with electrical charges in the order of 1 nC. The electrons constituting said electron packets have, moreover, such a high speed that their energy is several MeV or even several GeV compared to their rest energy of 0.511 MeV. A traditional undulator is a device formed of electromagnets or permanent magnets wherein the north-south and south-north magnetic pole pairs are arranged with alternating orientation one after the other in such a way that a gap of several millimeters (mm) in size exists between the south poles of each said pair. High-energy electrons produced by the electron accelerator and propagating between the magnetic pole pairs of the undulator perform an undulating motion due to the magnetic field that varies with distance and thus release EM radiation; this is the so-called undulator effect. The wavelength of the emitted radiation is directly proportional to the spatial period of the magnetic field strength (from now on, the "undulator period") and inversely proportional to the square of the electron energy.

Due to technical reasons, the undulator period of an undulator comprising magnets is at least two centimeters, typically three centimeters in length. Hence, to generate radiation with wavelength of 400 nm, which corresponds to the short wavelength end of the visible light range, electrons with energies higher then 100 MeV are required. To achieve the wavelength of 1 nm that can be used for high spatial resolution imaging of biological components (cell parts), electron energies of even several GeV are needed. The higher electron energy is to be reached via acceleration, the larger and the more expensive electron accelerator is required. The electron accelerator used for the free-electron laser of the shortest wavelength that operates nowadays produces 20 GeV electrons. This 20 GeV accelerator is several kilometers in length and its market costs are near to about one billion dollars in turn. Therefore, it is a long-standing high demand to find a solution that requires low electron energies to achieve a certain free-electron laser wavelength which also implies the application of an electron accelerator with smaller linear dimensions.

The paper by T. Shintake, K. Huke, J. Tanaka, I. Sato and I. Kumabe entitled *Development of Microwave Undulator* [Japan J. Appl. Phys. 22, 844-851 (1984)] discloses an undulator based on microwave standing waves generated in a microwave waveguide instead of a magnet undulator. Here, the standing wave is generated in a microwave resonator. The waves forming said standing waves travel within the waveguide in directions coincident with and opposite to the propagation direction of electrons. As a consequence of the applied, relatively low, frequency of 2.3 GHz, the undulator period is 5.5 cm. Decreasing the undulator period would require the usage of a microwave generator of higher frequency and thus of higher power. However, generators with such parameters (300 GHz, 3 GW) are not available, and hence, this solution could not get around, amongst others for this reason.

The possibility of exploiting a high-intensity laser light travelling opposite to electrons (i.e. in a longitudinal configuration) as undulator has been investigated in numerous scientific publications, such as e.g. by the authors J. Gea-Banacloche, G. T. Moore, R. R. Schlicher, M. O. Scully and H. Walther in their paper entitled *Soft X-ray free-electron laser with a laser undulator* [IEEE J-QE 23, 1558-1570 (1987)]. A laser beam travelling opposite to electrons can exhibit a minimal beam size and a least possible divergence if its transverse intensity distribution follows a Gaussian function (that is, the laser beam is a Gaussian beam). In case of a minimal beam size of several tens of micrometer required in an undulator of the present type, the size of a Gaussian beam changes considerably upon several mm's of propagation. Therefore, the interaction length is very short which excludes the (free-electron) laser activity. Moreover, due to the intensity changing with beam size, the wavelength of the EM radiation emitted by the electrons also varies. Furthermore, the effective wavelength of the laser ensuring the undulator effect changes in the vicinity of the focus (Gouy phase shift) that also results in a change of the wavelength of the emitted EM radiation. As a consequence of the difficulties described here, the undulator discussed in said paper theoretically, as well as the free-electron laser comprising such an undulator proved to be unaccomplishable in practice.

To eliminate the problems encountered above, transverse configurations have been proposed wherein the electron beam and the laser beam inducing the undulator effect travel perpendicular or essentially perpendicular to one another instead of opposite to one another. The paper by T. Plettner and R. L. Byer entitled *Proposed dielectric-based microstructure laser-driven undulator* [Phys. Rev. Spec. Top.—Accelerators and Beams 11, 030704 (2008)] suggests a theoretical solution wherein the electron beam propagates between two parallel dielectric gratings located at a given distance apart from one another. The undulator effect is provided by a laser beam that travels at right angle to the gratings and the propagation direction of the electrons. A laser beam with wavelength of 1 micrometer is considered. Since the distance between the two gratings has to be equal to a quarter of the laser wavelength, which should be 250 nm in this case, but the diameter of an electron packet carrying the appropriate amount of electrical charge is several micrometers (typically, several tens of micrometer), the solution described in this publication cannot be accomplished in practice as the electron packet cannot simply pass between said dielectric gratings.

Some other solutions are also known wherein the undulator effect is provided through the volume charge of a plasma generated from an ionizable substance. Such a solution is disclosed in e.g. U.S. Pat. No. 5,822,342 and Japanese Patent Publication No. 2011-118696. The electric field, which is partially transverse and partially longitudinal, inducing the undulation is generated indirectly by means of interfering laser beams: a periodic plasma structure is created via the resonant ionization of a metal vapour, the undulator effect is provided by the electrostatic field (or being precisely, its transversal component) that is generated by the periodic volume charge of particles becoming ionized with a spatial distribution in harmony with the interference pattern. Besides the complexity and thus high costs of said plasma type solutions, a further drawback thereof is that in an undulator of this type, the electrons travel in the ionized metal vapour instead of vacuum or a partially evacuated volume portion which can strongly influence their properties under certain circumstances. A yet further drawback of the plasma type solutions is that in this case it is only the transversal component of the electric field that is effective in compelling the undulation.

The scientific publication by A. D. Debus, M. Bussmann, M. Siebold, A. Jochmann, U. Schramm, T. E. Cowan and R. Sauerbrey entitled *Travelling-wave Thomson scattering and optical undulators for high-yield EUV and X-ray sources* [Appl. Phys. B 100, 61-76 (2010)] teaches a yet further theoretical transversal configuration. According to this, the laser beam propagates along a direction that forms an angle φ with the propagation direction of the electron packet, and an interaction of said laser beam with said electron packet along a much longer distance than those experienced in the processes proposed by Gea-Banacloche and others is attempted to be achieved by means of tilted-pulse-front excitation. However, the direction of the emitted EM radiation was erroneously calculated by the authors, and hence when leaning on the teaching provided in the publication at issue, a skilled person will not be capable of using/accomplishing the configuration disclosed in practice, since the thus obtained EM radiation propagates in a direction that does not correspond to the propagation direction of the electron packet and therefore no microbunching develops in the electron packet. Hence, the emitted EM radiation will not be coherent and intense either, that are essential for (free-electron) laser activity.

In light of the above, the object of the present invention is to provide an optical type (from now on, optical) short-period undulator of simple construction that exhibits a shorter undulator period compared to the spatial period of similar type, i.e. non plasma type undulators nowadays available. A further object of the present invention is to provide an optical undulator that enables an increased interaction length compared to the one achievable in laser based undulators proposed theoretically. A yet further object of the present invention is to prepare an optical undulator that requires electron packets of lower energies compared to the prior art solutions for generating EM radiation with short wavelength and high intensity, optionally being also coherent. A yet further object of the present invention is to provide a free-electron laser capable of generating EM radiation with high intensity and short wavelength, optionally being also coherent, by exploiting lower energy electron beams (and thus an electron accelerator with smaller linear dimensions/power) compared to those of the prior art free-electron lasers. A yet further object of the present invention is to work out a method for generating EM radiation with high intensity and short wavelength, optionally being also coherent.

Based on our studies we concluded that by interacting high-intensity terahertz (THz) frequency electromagnetic pulses EM standing waves can be directly generated, and if an electron beam is suitably introduced into the resultant electric field of the obtained EM standing waves and is then made pass through it, the electrons in said electron beam will emit EM radiation with a coherence level that depends on the degree of microbunching in said electron beam. In particular, high-energy (relativistic) electrons travelling in or near to a plane spanned by the points of maximum (i.e. antinodes) of the electric field strength of the EM standing wave generated by interfering the THz pulses that propagate essentially opposite to one another (i.e. face-to-face) are compelled to perform undulating motion due to the temporally alternating electric field strength. Electrons moving in this way emit EM radiation in their propagation direction with frequencies much higher than the frequency of the applied THz pulses: for electron energies ranging from several tens of MeV to several hundreds of MeV the thus obtained radiation falls into the ultraviolet (UV), vacuum-ultraviolet (VUV), extreme ultraviolet (XUV) or X-ray regime of the electromagnetic spectrum; in case of yet higher electron energies, extremely hard X-ray radiation can be achieved. Here, and from now on, the term "near to a plane spanned by the points of maximum (i.e. antinodes) of the electric field strength" refers to a region preferably centred on the plane (S) concerned within which the value of the electric field strength differs from its maximal value in the plane by at most 10 percent, more preferably by at most 5 percent. These conditions are fulfilled inside a domain of preferably ±0.07 wavelength, more preferably ±0.05 wavelength in width around the antinodes. In particular, for a THz pulse length of λ=500 micrometers, this results in a domain of preferably 70 micrometers, more preferably 50 micrometers in width (D) in a direction perpendicular to the plane (i.e. transversally) spanned by the antinodes of the electric field strength and located in a centred position over said plane.

Our object to generate high-intensity and short-wavelength EM radiation has been achieved by subject matter described herein.

The inventive solution allows to realize an undulator period that is about a hundred times smaller than that of common undulators making use of magnets. This means that to operate a free-electron laser of a certain (short-)wavelength built with such an undulator, an electron packet is already appropriate the energy of which is ten times smaller; such an electron packet can be generated by smaller and cheaper electron accelerators. Compared to the application of the above discussed laser undulators, the application of an undulator according to the invention sets lighter and thus practically satisfiable requirements as to the electron beam parameters (such as transversal emission, monocromatism in energy), as it is shown by the equations (18) and (21) in the paper by R. Bonifacio, N. Piovella, M. M. Cola and L. Volpe entitled *Experimental requirements for X-ray compact free electron lasers with a laser wiggler* [Nucl. Instr. Meth. Phys. Res. A 577, 745-750 (2007)], the content of which is considered to be fully incorporated in the present application by reference. Due to the transversal geometry, in comparison with laser undulators, a yet further advantage of the invention is the longer interaction length, as well as the elimination of the effect of the Gouy phase shift mentioned earlier. It is noted that the above discussed inventive concept can equally be used to generate coherent EM radiation and EM radiation of lower degree of coherence (or even not coherent EM radiation) as well. For the former, the laser beam of a free-electron laser, for the latter, the creation of EM radiation by Thomson scattering can serve an example.

In what follows, the invention will be explained in more detail via several preferred embodiments thereof and referring to the attached drawings. In the drawings

Figure 1:
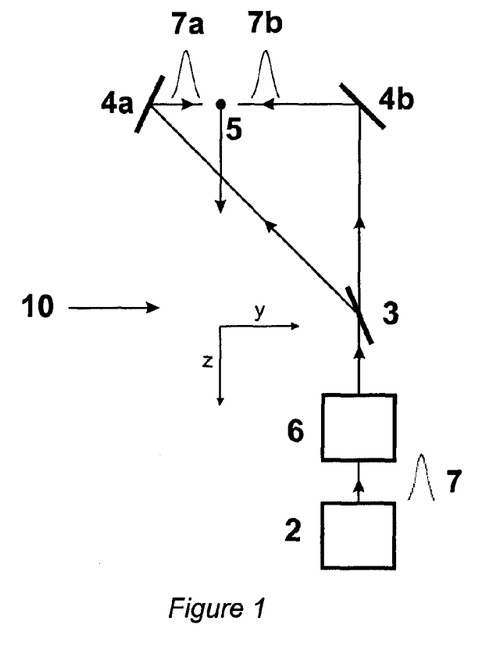
FIG. 1 is a basic diagram of the optical (terahertz) short-period undulator according to the invention.

FIG. 1 shows schematically an optical, terahertz, short-period undulator 10. The terahertz undulator 10 forces the electrons in an electron packet 5 of a high-energy electron source (not shown) to oscillate transversally (in direction x in the (x,y,z) Cartesian coordinate system indicated in FIG. 1, that is, perpendicularly to the plane of said Figure) or to perform an undulating motion, and thus to emit short-wavelength EM radiation (not illustrated either) by maintaining along a portion of the path of the electron packet an electric field strength with alternating direction. To this end, the terahertz undulator 10 comprises a high-intensity pulse source 2 emitting within the THz frequency range; said pulse source 2 generates an EM pulse 7 of THz frequency with one or more optical cycles. Having passed a beam splitter 3, said THz pulse 7 propagates in the form of pulses 7a, 7b. The pulses 7a, 7b are reflected by focusing optical elements 4a, 4b, respectively, which are provided by e.g. focusing mirrors in this embodiment, and travel in this case along the +y and −y directions opposite (or almost opposite) to one another, that is, their propagation directions form essentially an angle of 180°, and as a result of interfering with one another they create a standing wave (not shown in the figure) in the vicinity of the crossing location of the electron packet 5 along the z-axis, i.e. in a so-called interaction region. It is noted that if the pulses 7a, 7b propagate in directions forming an angle that differs from 180°, the wavelength of the radiation thus generated is increased with a factor of $1/(1-\cos\alpha)$; here α represents half of the angle formed by the propagation directions of the pulses 7a and 7b. Hence, to create the standing wave, pulses travelling preferably opposite to one another, i.e. pulses the propagation directions of which form an angle of about 180° are made use of.

If needed, for example to increase the electric field strengths of the pulses 7a, 7b, said optical elements also perform a proper imaging of the pulses 7a, 7b besides their guidance. The electric field strength directs along the x-axis in the thus obtained standing wave, and one of the antinodes (on the z-axis) of said standing wave preferably corresponds to the crossing location of the electron packet 5; the electron packet 5 propagates in or near to a plane S (see FIGS. 3 and 4) spanned by the points of maximum of the resultant electric field strength of the standing wave. The latter condition can be met by fine tuning the relative position of the electron packet 5 and the standing wave generated, e.g. by appropriately delaying the pulses 7a and 7b relative to one another. Said delay can be induced e.g. by inserting optical delay element(s) (not illustrated in the drawing) into the propagation path of the pulses 7a, 7b, as it is apparent to a person skilled in the field of optics. The intensity of the THz pulse source 2 is sufficiently large in order that the maximal field strength of the electric field alternating in time reach a value (ranging, preferentially, from 1 MV/cm to 100 MV/cm) that is a requisite for the operation in a domain of suitable length (ranging, preferentially, from 10 cm to 30 cm) along the z-axis.

Figure 2:
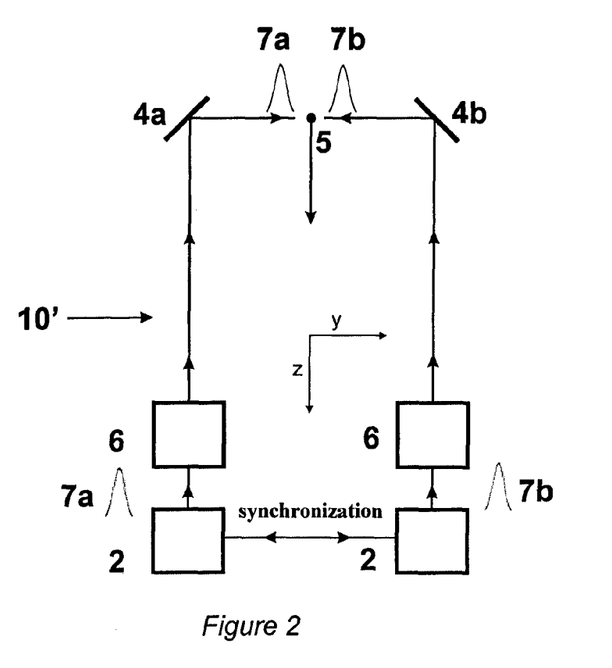
FIG. 2 is a basic diagram showing an embodiment of the THz undulator, wherein generation of the THz pulses creating the EM standing wave takes place by means of pulse sources that are separate from but synchronized with one another.

The THz pulses creating said standing wave can equally be generated by pulse sources 2 that are separated in space but operated in a synchronized way. Such a configuration is illustrated in FIG. 2 that schematically shows a terahertz undulator 10'. In such embodiments of the inventive optical, short-period undulator, there is no need for beam splitter(s). Synchronization of the two or more separate THz pulse sources 2 is accomplished e.g. by a synchronized operation of the laser systems energizing said sources via processes well-known in laser technology, for example—as it is apparent to a person skilled in the relevant art—by making use of a common oscillator.

In preferred further embodiments of the undulators 10, 10' according to the invention, to increase the interaction length between the electron packet 5 and the standing wave (i.e. the field with spatially localized and temporally alternating field strength) obtained by interfering the pulses 7a and 7b, the intensity front of pulse 7 or the intensity fronts of pulses 7a, 7b generated by the high-intensity THz pulse source/sources 2 is/are tilted—in a way to be discussed below in more detail—relative to the phase front/fronts of said pulse/pulses. To this end, suitable optical element(s) 6 is/are applied, that is/are arranged in the propagation path(s) of pulse 7 or pulses 7a, 7b, preferably antecedent to the optical elements 4a, 4b.

The inventive solution can be used to construct free-electron lasers of short wavelength (UV, VUV, XUV, X-ray) in practice. Compared to traditional magnet undulators, in such applications of the solution an electron beam of considerably lower energy can be used. Thus, an electron accelerator is needed that has considerably smaller (linear) dimensions and is cheaper. Furthermore, the THz undulator according to the present invention—in comparison with the laser undulators—sets lighter requirements as to the electron beam parameters. Hence, by combining the THz undulator according to the invention with electron accelerators available nowadays a free-electron laser can be built. Due to the required electron beam parameters in the case of laser undulators, this cannot be achieved when laser undulators are to be used. The transversal or almost transversal excitation implemented within the short-period undulators according to the invention allows to achieve much longer interaction lengths between the EM standing wave created by the interference of the exciting THz pulses and the electron packet than what is obtainable in a longitudinal configuration (wherein the electron packet and the exciting pulse travel opposite to one another).

The inventive solution can also be used as a short-wavelength (UV, VUV, XUV, X-ray) EM radiation source based on Thomson scattering. In such applications it is preferred, while when used in free-electron lasers it is necessary that the peak value of the electric field strength of the EM standing wave obtained as a result of interfering the THz pulses within the THz undulator according to the invention attains a value of at least 1 MV/cm, more preferably at least 10 MV/cm at the crossing location of the electron packet. This can be accomplished by e.g. the procedure described in the paper by H. Hirori, A. Doi, F. Blanchard and K. Tanaka entitled *Single-cycle terahertz pulses with amplitudes exceeding 1 MV/cm generated by optical rectification in LiNbO3* [Appl. Phys. Lett. 98, 091106 (2011)], the content of which is considered to be incorporated in the present application by reference. Focusing intense THz pulses obtained from ultra short laser pulses via optical rectification within the LiNbO$_3$ crystal results in an electric field strength that exceeds the value of 1 MV/cm in the vicinity of the focal plane.

Figure 3:
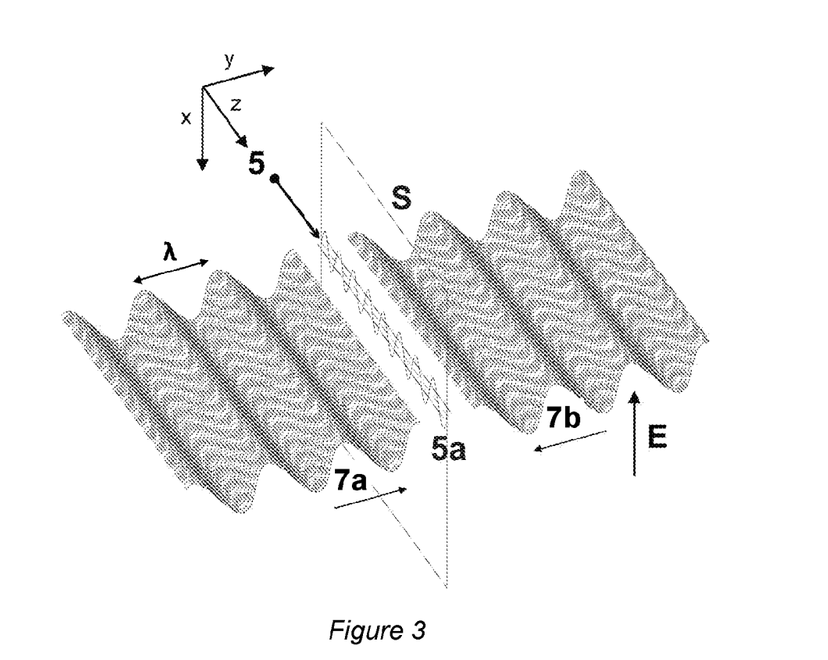
FIG. 3 illustrates the spatial dependency of the electric field strengths of the THz pulses creating the standing wave that ensures the undulator effect within a THz undulator according to the invention.

FIG. 3 shows schematically the vicinity of the focal plane S of the THz pulses 7a, 7b, as well as the interaction region of width D of the electron packet 5 moving along an undulating path 5a and the standing wave created by interfering the pulses 7a, 7b. Depending on the desired radiation wavelength and the interaction length set, the required minimum of the field strength might even be several tens of MV/cm, however, in light of the above it is at least 1 MV/cm. THz pulses with such a high electric field strength can only be generated with a very short duration in time, falling preferably into a range extending from several picoseconds to several tens of picosecond (ps).

Figure 4:
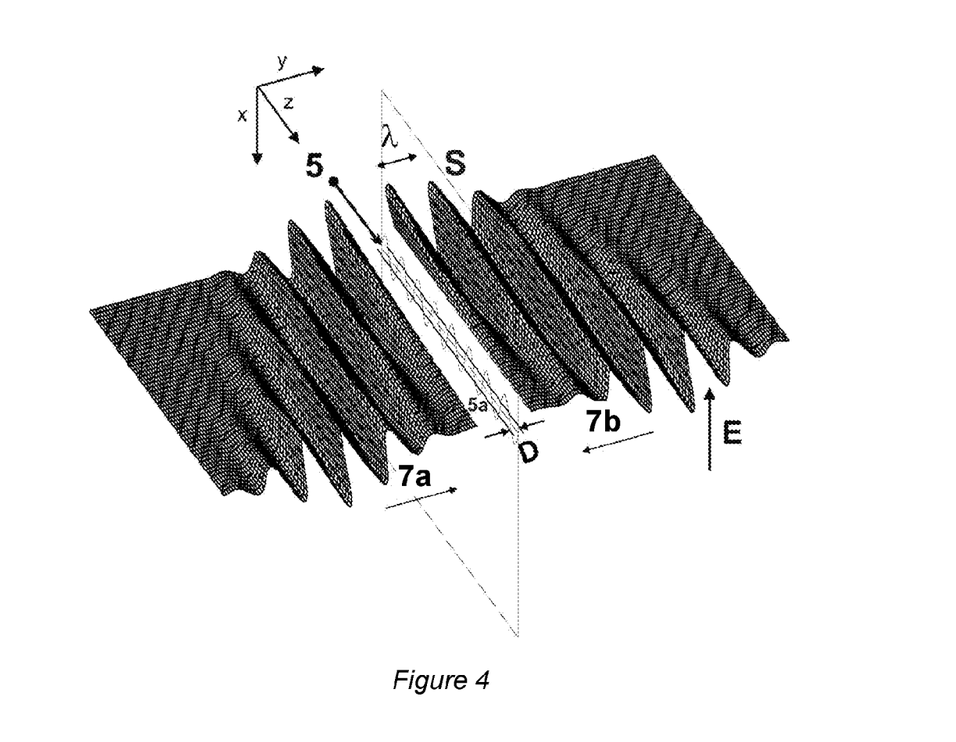
FIG. 4 shows the spatial dependency of the electric field strengths of the THz pulses creating the standing wave that enables the undulator effect within a THz undulator according to the invention when applying THz pulses with the intensity front tilted relative to the phase front.

Said interaction length of the THz pulses 7a, 7b and the electron packet 5 can be significantly increased for pulses of several ps in duration if the intensity fronts of said THz pulses 7a, 7b get tilted relative to the phase fronts thereof, as it is shown in FIG. 4. This can be achieved by inserting said optical element 6 (see FIG. 1) in the paths 5a of the pulses 7a, 7b; the optical element 6 is provided in the form of an optical element that induces tilting of the intensity front of a THz pulse traversing it relative to the phase front of said pulse. Tilting of the pulse front can be effected by making use of e.g. an optical grating or a combination of a grating and optical imaging. Consequently, said optical element 6 is provided preferably by an optical grating or by an imaging system combined with an optical grating. The construction of a means for tilting the pulse front is disclosed, for example, in the publication by J. A. Fülöp, L. Pálfalvi, G. Almási and J. Hebling entitled *Design of high-energy terahertz sources based on optical rectification* [Optics Express 18, 12311-12327 (2010)], which is also considered to be incorporated in this application by reference.

Having traversed the beam splitter 3 and being reflected by the optical elements 4a, 4b provided by focusing mirrors, the THz pulses 7a, 7b with tilted intensity front travel opposite (or near to opposite) to one another along the directions +y and −y and create an EM standing wave in the vicinity of the crossing location of the electron packet 5 along the z-axis in such a way that said crossing location of the electron packet 5 will be in or near to a plane S defined by a position of maximum, i.e. antinode (considered on the z-axis) of the resultant electric field strength of said standing wave. By tilting the intensity front of the THz pulses, it can be achieved that the intensity of the THz pulses at a certain location along the z-axis becomes maximal just at the instant when the electron packet crosses said certain location along the z-axis.

To embody a THz short-period undulator according to the invention in practice, we have realized not only the fact that an undulator with suitable spatial period can be produced in a transversal excitation geometry by means of THz frequency pulses, but also the fact that THz pulses with the required resultant maximal field strength of at least 1 MV/cm, preferably at least 10 MV/cm can also be generated in practice. Due to its large nonlinear optical coefficient and high damage threshold, LiNbO$_3$ crystal (LN) is one of the most appropriate dielectric material exhibiting nonlinear optical properties for generating high-energy and high field strength THz pulses. The already cited paper by the authors H. Hirori, A. Doi, F. Blanchard and K. Tanaka teaches the generation of THz pulses with 1 MV/cm field strength in LN by means of ultra short laser pulses. According to the calculations published in the paper by J. A. Fülöp, L. Pálfalvi, M. C. Hoffmann and J. Hebling entitled Towards generation of mJ-level ultra short THz pulses by optical rectification [Optics Express 19, 15090-15097 (2011)], THz pulses with even 100 MV/cm field strength can be generated by a contact grating arrangement disclosed in the paper by L. Pálfalvi, J. A. Fölöp, G. Almási and J. Hebling entitled *Novel setups for extremely high power single-cycle terahertz pulse generation by optical rectification* [Appl. Phys. Lett. 92, 171107 (2008)] and by laser pulses of optimal duration (about 500 femtoseconds), for example from said ultra short laser pulses via the technique of difference frequency generation or by optical rectification of said ultra short laser pulses. The contact grating arrangement is shown in FIG. 4 of this latter publication, the content of which is considered to be incorporated in the present application by reference. The THz pulses needed for producing a short-period undulator according to the invention can equally be generated within semiconducting (for example GaAs, GaP or ZnTe) crystals exhibiting nonlinear optical properties.

In a preferred embodiment of the optical short-period undulator according to the invention shown in FIG. 1, pulses 7 with frequency of 0.6 THz and duration of 5 ps are generated by the THz pulse source 2. Said THz pulses 7 are split into two by means of the beam splitter 3. The intensity fronts of the thus obtained pulses 7a, 7b directed preferably opposite to one another by means of optical elements 4a, 4b provided in the form of focusing mirrors are tilted in preferably 45° relative to the phase fronts of said pulses 7a, 7b. Moreover, the maximal value of the electric field strength of the standing wave created by interfering the pulses 7a and 7b is about 10 MV/cm. An electron packet 5 with electric charge of 0.42 nC, duration of 20 fs and electron energies of 91 MeV is produced by an electron source. By introducing said electron packet 5 into the undulator 10, the undulator 10 makes the electrons emit EM wave of 4 nm in wavelength (that is, X-ray radiation). The EM wave gets amplified as the electron packet 5 progresses along the geometrical axis (e.g. the z-axis in FIG. 4) of the undulator 10. The amplification length (that is, the length over which the intensity of the radiation reaches just an e-fold increase; here e is the Euler number) is 12 mm. If the geometrical length of the undulator 10 reaches a value of six to ten times of said amplification length, the radiation will saturate that means efficient radiation generation. To operate a terahertz undulator 10 of this length (i.e. with length of about 70 to 120 mm) in accordance with its objective, a THz pulse 7 with energy of about 120 to 190 mJ has to be generated by the THz pulse source 2.

Figure 5:
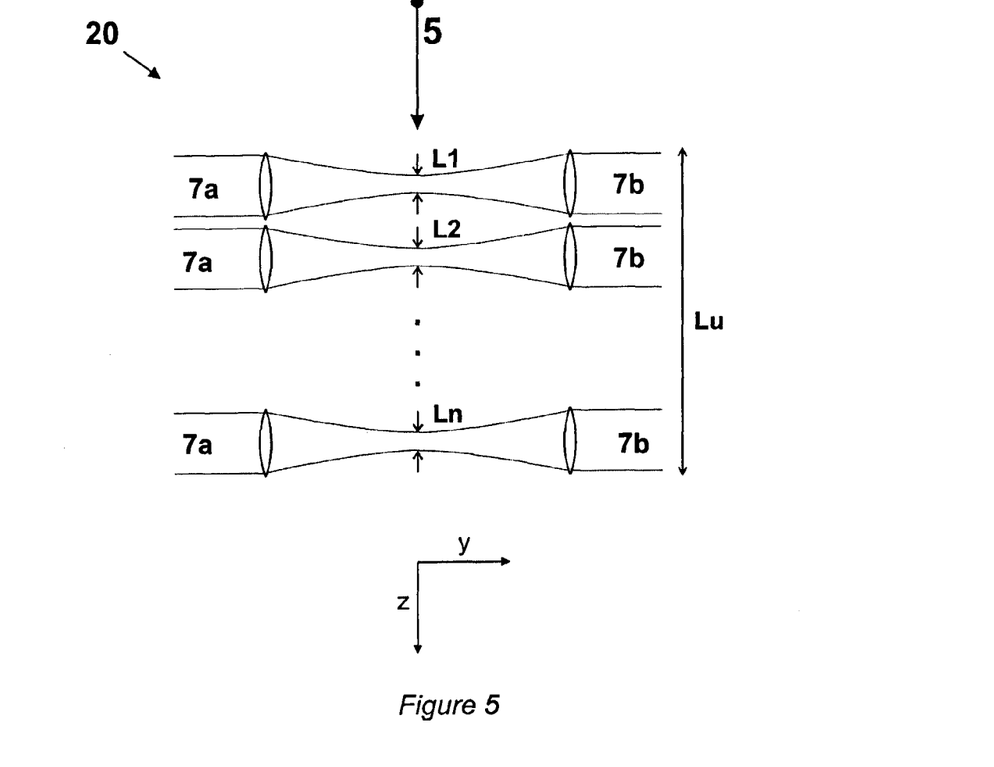
FIG. 5 illustrates the interaction region, as well as its vicinity, of the electron beam and the standing wave for a possible further embodiment, wherein an overall interaction length (L) of the undulator is realized by the totality of shorter interaction lengths (L1, L2, . . . , Ln) of several subundulators.
Figure 6:
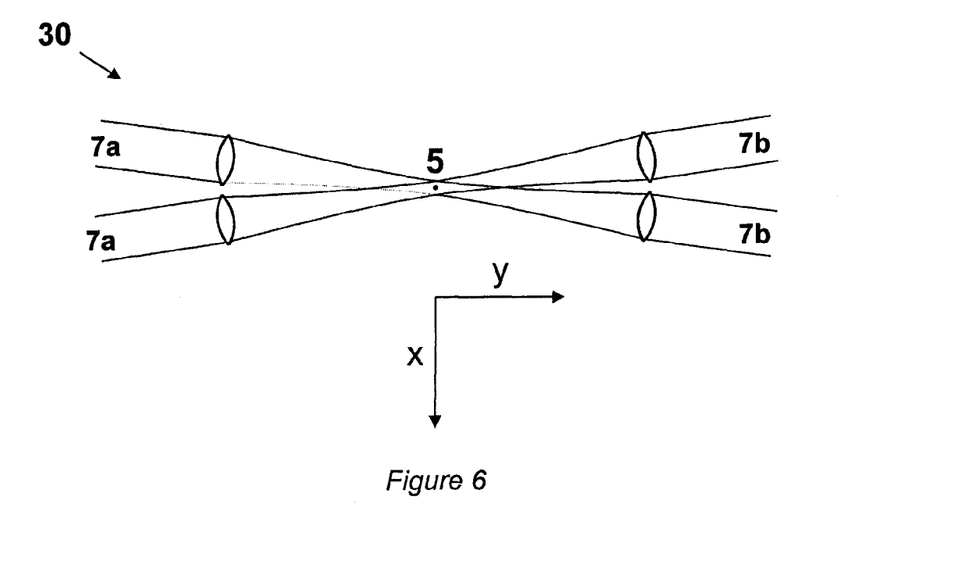
FIG. 6 shows a possible yet further embodiment of an undulator according to the invention, wherein the total geometrical length Lu of the undulator can be decreased relative to that of the configuration illustrated in FIG. 5 by rotating each subundulator by small angles relative to one another around the z axis.

For technical reasons (e.g. diameter of imaging optics, appearance of aberrations), it is preferred to construct a terahertz undulator with an interaction length of about 10 cm split into several (to e.g. n pieces) parts. FIG. 5 illustrates schematically such an undulator 20. The required undulator interaction length L (that was 10 cm in the above example) shall be reached by the sum L=L1+L2+. . . +Ln of the individual interaction lengths L1, L2, . . . , Ln of the n subundulators. The THz pulses 7a, 7b needed for the operation of the subundulators can be obtained as discussed above, for example from a single THz pulse source by means of beam splitters or from a plurality of separate THz pulse sources synchronized with one another. Due to focusing of the THz pulses, as it can be seen in FIG. 5, the overall geometrical length Lu of the undulator 20 will be much larger than the interaction length L of the undulator 20. For an undulator 30 illustrated schematically in FIG. 6, a decrease in the ratio Lu/L of the two lengths, i.e. a shorter geometrical length Lu can be achieved. To this end, the individual subundulators are rotated relative to one another with small (preferably at most)30° angles around the propagation direction of the electron packet 5, as geometrical axis (i.e. around the z-axis), as a consequence of which the interaction regions can get closer to one another. Making use of this geometry, as well as exploiting other techniques and devices (e.g. beam guiding mirrors) widespread in the field of optics and also known by a skilled person in the relevant art, the ratio Lu/L can be decreased to a value preferably smaller than five.

An advantage of the THz undulator according to the invention is well illustrated by the following: if X-ray radiation of wavelength 4 nm is to be generated by a traditional magnet undulator, an undulator of 3 meters in length would be required instead of the inventive undulator of 50 cm (Lu=5×10 cm) in length (here, an undulator period of 25 mm is assumed). A much greater disadvantage, however, is that electron packets with energy of 660 MeV (instead of 91 MeV) should be generated and introduced into the magnet undulator. Generation of such electron packets is only possible by means of an electron accelerator with significantly larger physical (linear) dimensions as well as higher constructional (and operational) costs.

If the optical short-period undulator according to the invention is planned to use for generating EUV electromagnetic wave of 20 nm in wavelength, the energy of the electrons within the electron packet should be merely 40 MeV. To generate such electrons, only a (desktop) electron accelerator of several meters in length is required. Moreover, the interaction length and the energy of the terahertz pulses of the optical terahertz undulator according to the invention should reach only about 50 mm and merely about 100 mJ, respectively.

Figure 7A:
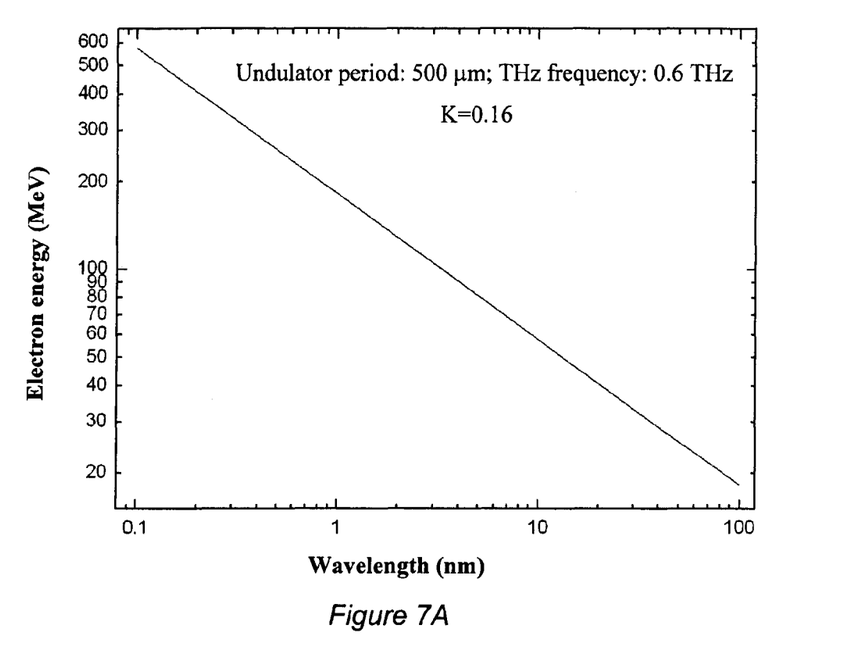
FIG. 7A represents the required energy of the electron beam as a function of the wavelength of the EM radiation to be generated for a given undulator period and undulator parameter K.
Figure 7B:
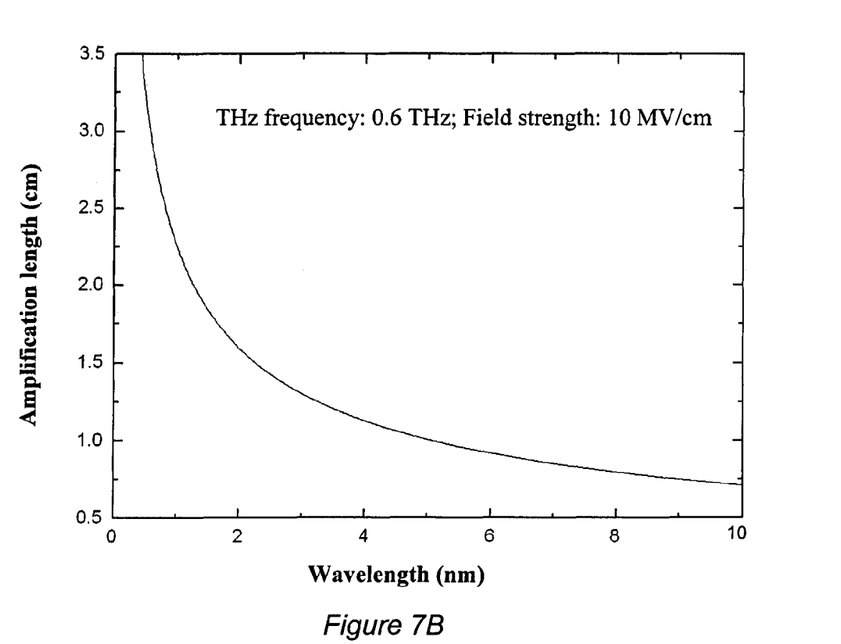
FIG. 7B illustrates the amplification length as a function of the wavelength of the EM radiation to be generated when using THz pulses with frequency of 0.6 THz and resulting 10 MV/cm peak electric field strength (that is, if two pulses are assumed, each pulse with 5 MV/cm maximal electric field strength).

For a given THz frequency and electric field strength, the wavelength of the EM radiation generated (e.g. of the laser beam emitted by a free-electron laser that can be constructed by making use of an undulator according to the invention) can be varied over a broad range. FIG. 7A and 7B show the required energy of the electron beam and the amplification length, respectively, as a function of wavelength to be generated when THz pulses with frequency of 0.6 THz and creating a standing wave with 10 MV/cm peak electric field strength are applied.

As it is apparent in light of the above to a person skilled in the relevant art, the terahertz optical short-period undulator according to the present invention can be used not only in free-electron lasers for generating coherent EM radiation, but also as a part of radiation sources based on Thomson scattering.

The invention claimed is:

1. A method for generating electromagnetic radiation using a high-energy electrically charged particle beam, the method comprising:
    generating high-intensity electromagnetic pulses (7; 7a, 7b) falling into a terahertz frequency range;
    creating an electromagnetic standing wave by interfering said pulses (7; 7a, 7b) with one another by directing the pulses essentially toward each other in a first direction (y), said standing wave having an electric field strength of a pre-determined peak value and oscillating in time in a first plane (S) perpendicular to the first direction;
    directing said particle beam through a temporally alternating electromagnetic field of said standing wave in a region of certain width (D), such that the particle beam is forced to travel in a second direction (z) essentially parallel with the first plane along an undulating path (5a) in said region and by interacting with said temporally alternating electromagnetic field of the standing wave emit electromagnetic radiation that propagates in a propagation direction of the particle beam, wherein
    value of the electric field strength over said region in the first direction (y) differs from said peak value by at most about 10 percent.

2. The method according to claim 1, further comprising generating the pulses (7a, 7b) by splitting a singe terahertz pulse (7) generated by a high-intensity pulse source (2).

3. The method according to claim 1, wherein the high-intensity pulses (7; 7a, 7b) falling into the terahertz frequency range are generated from ultra short laser pulses by difference frequency generation or by optical rectification of ultra short laser pulses.

4. The method according to claim 3, wherein the generation of high-intensity pulses (7; 7a, 7b) falling into the terahertz frequency range is performed in a dielectric or semiconducting crystal exhibiting nonlinear optical properties.

5. The method according to claim 1, wherein the high intensity pulses (7; 7a, 7bfalling into the terahertz frequency range comprise one or more optical cycles.

6. The method according to claim 1, wherein the high-intensity pulses (7; 7a, 7b) falling into the terahertz frequency range are provided with an intensity front tilted relative to their phase front.

7. The method according to claim 1, further comprising interfering the high-intensity pulses (7; 7a, 7b) falling into the terahertz frequency range to create standing waves with at least 1 MV/cm peak electric field strength.

8. The method according to claim 1, wherein the frequency of said high-intensity pulses (7; 7a, 7b) falling into the terahertz frequency range ranges from 0.01 THz to 100THz.

9. The method according to claim 1, wherein the electrically charged particle beam is provided by a beam of electron packets (5).

10. The method according to claim 1, wherein the value of the electric field strength in said region differs from the peak value by at most about 5 percent.

11. The method according to claim 10, wherein said region is centered on the first plane (S) containing said undulating path (5a) of the particle beam.

12. The method according to claim 1, wherein the width of said region is set to be at most 0.14×λ, wherein λ denotes the wavelength of the high-intensity electromagnetic pulses (7; 7a, 7b) generated.

13. A method for generating electromagnetic radiation using a high-energy electrically charged particle beam, the method comprising:
   transmitting said charged particle beam along a propagation path;
   generating high-intensity electromagnetic pulses (7; 7a, 7b) falling into a terahertz frequency range;
   creating at least two electromagnetic standing waves at consecutive locations along the propagation path by interfering said pulses (7; 7a, 7b) with one another by directing the pulses essentially toward each other in a respective first direction at each location, said standing waves each having an electric field strength of a pre-determined peak value and oscillating in time in a respective first plane perpendicular to said respective first direction;
   directing said particle beam through the temporally alternating electromagnetic field of each standing wave in a respective region of certain width, such that the particle beam is forced to travel in a respective second direction essentially parallel with said respective first plane along an undulating path in the respective region and by interacting with said temporally alternating electromagnetic field of said respective standing wave emit electromagnetic radiation that propagates in a propagation direction of the particle beam, wherein
   value of the electric field strength over each of said respective regions in the respective first direction differs from said peak value by at most about 10 percent.

14. The method according to claim 13, wherein said standing waves at consecutive locations are rotated relative to one another around the propagation direction of the particle beam.

15. The method according to claim 13, wherein each of the high-intensity pulses (7; 7a, 7b) falling into terahertz frequency range is provided with an intensity front tilted relative to a phase front thereof.

16. An apparatus to generate electromagnetic radiation by a high-energy electrically charged particle beam, the apparatus comprising:
   a particle source configured to provide a high-energy electrically charged particle beam;
   a pulse source (2) configured to provide high-intensity electromagnetic pulses (7; 7a, 7b) falling into a terahertz frequency range;
   wherein the particle source and the pulse source are configured to, in operation:
      create an electromagnetic standing wave by interfering the pulses (7; 7a, 7b) with one another by directing the pulses essentially toward each other in a first direction (y), said standing wave having an electric field strength of a pre-determined peak value and oscillating in time in a first plane (S) perpendicular to the first direction; and
      direct said particle beam through a temporally alternating electromagnetic field of said standing wave in a region of certain width (D), such that the particle beam is forced to travel in a second direction (z) essentially parallel with the first plane along an undulating path (5a) in said region and by interacting with said temporally alternating electromagnetic field of the standing wave emit the electromagnetic radiation, wherein
      value of the electric field strength over said region in the first direction (y) differs from said peak value by at most about 10 percent.

17. apparatus according to claim 16, wherein the high-intensity pulses (7; 7a, 7b) are pulses each of which has an intensity front tilted relative to a phase front of the pulse.

18. The apparatus according to claim 16, wherein frequency of said high-intensity pulses (7; 7a, 7b) falling into the terahertz frequency ranges from 0.01 THz to 100 THz.

19. The apparatus according to claim 16, wherein the particle source comprises an electron source configured to emit a beam of electron packets (5).

* * * * *